United States Patent [19]

McFalls

[11] Patent Number: 5,208,953
[45] Date of Patent: May 11, 1993

[54] SEAT BELT BUCKLE HAVING PIVOTAL LEVER

[75] Inventor: Bob L. McFalls, Shelby Township, Macomb County, Mich.

[73] Assignee: TRW Vehicle Safety Systems Inc., Lyndhurst, Ohio

[21] Appl. No.: 800,444

[22] Filed: Nov. 26, 1991

[51] Int. Cl.⁵ .............................................. A44B 11/10
[52] U.S. Cl. ........................................ 24/639; 24/642; 24/573.5
[58] Field of Search .............. 24/639, 642, 651, 573.5; 280/801, 808, 805, 806, 807; 297/468, 483, 480

[56] References Cited

U.S. PATENT DOCUMENTS

| | | | |
|---|---|---|---|
| 2,904,347 | 9/1959 | Tucker | 297/468 |
| 3,408,707 | 11/1968 | Hemphill | 24/639 |
| 3,451,720 | 6/1969 | Makinen . | |
| 3,600,768 | 8/1971 | Romanzi et al. . | |
| 3,626,556 | 12/1971 | Struck . | |
| 3,981,519 | 12/1976 | Cataldo . | |
| 4,302,049 | 11/1981 | Simpson . | |
| 4,597,141 | 7/1986 | Wier . | |
| 4,611,369 | 9/1986 | Wier . | |
| 4,614,010 | 9/1986 | Charlton et al. . | |
| 4,624,035 | 11/1986 | Wier . | |
| 4,870,726 | 10/1989 | Eksell et al. | 24/636 |
| 4,915,413 | 4/1990 | Meyer | 24/642 |

FOREIGN PATENT DOCUMENTS

7609225 2/1977 Netherlands .
2123475 2/1984 United Kingdom .................. 24/633

*Primary Examiner*—Karin L. Tyson
*Attorney, Agent, or Firm*—Tarolli, Sundheim & Covell

[57] ABSTRACT

A buckle for receiving a locking tongue connected to a seat belt has a passage into which the tongue is movable and a locking member movable in the passage. The locking member is movable into and out of locking engagement with the tongue when the tongue is received in the passage. The buckle also has an unlocking member and a lever arm. The unlocking member is movable relative to the locking member, and moves the locking member out of engagement with the tongue when the unlocking member is moving relative to the locking member. The lever are has a handle portion and a cam surface. The cam surface is pivotally movable in sliding contact with the unlocking member to move the unlocking member relative to the locking member upon pivotal movement of the handle portion in a first direction away from the passage.

10 Claims, 9 Drawing Sheets

SEAT BELT BUCKLE HAVING PIVOTAL LEVER

FIELD OF THE INVENTION

The present invention relates to a buckle for receiving a tongue connected to a seat belt.

BACKGROUND OF THE INVENTION

U.S. Pat. No. 3,626,556 discloses an apparatus for restraining a vehicle occupant. The apparatus disclosed in the '556 patent includes a pair of lap belts which extend toward each other across the lap of a vehicle occupant, and a shoulder belt which extends across the shoulder of the vehicle occupant toward the lap belts. A buckle mechanism releasably connects the two lap belts and the shoulder belt to each other in front of the vehicle occupant. The buckle mechanism includes a buckle for the lap belts and another buckle for the shoulder belt. The lap belt buckle is a top release buckle having an actuator button which is pushed downward into the buckle by a vehicle occupant to release the lap belts. The shoulder belt buckle has an actuator lever which is pivoted downward by the thumb of the vehicle occupant to release the shoulder belt.

SUMMARY OF THE INVENTION

In accordance with the present invention, a buckle for receiving a tongue connected to a seat belt comprises means for defining a passage into which the tongue is movable, and a locking member movable in the passage. The locking member is movable into engagement with the tongue when the tongue is received in the passage to lock the tongue in the passage. The locking member is also movable out of engagement with the tongue to release the tongue for movement out of the passage. The buckle further comprises an unlocking member and a lever means. The unlocking member is movable relative to the locking member, and has means for moving the locking member out of engagement with the tongue when the unlocking member is moving relative to the locking member. The lever means moves the unlocking member relative to the locking member, and comprises a lever arm supported for pivotal movement The lever arm has a handle portion and a cam surface. The cam surface is pivotally movable in sliding contact with the unlocking member to move the unlocking member relative to the locking member upon pivotal movement of the handle portion in a direction away from the passage In a preferred embodiment of the invention, the buckle is a shoulder belt buckle in a three point seat belt system including a shoulder belt and a lap belt. The three point seat belt system also includes a lap belt buckle. The shoulder belt buckle has a housing containing the locking member and the unlocking member. The cam surface on the lever arm is located inside the housing The handle portion of the lever arm has first and second side surfaces facing away from each other in opposite directions. The handle portion also extends outward from the housing sufficiently to be grasped and moved pivotally by a vehicle occupant having a thumb and forefinger respectively engaging the first and second side surfaces In accordance with the invention, the lever arm is grasped between its opposite sides by a vehicle occupant and is moved pivotally in a direction away from the passage in which the tongue is locked. The shoulder belt buckle thus differs substantially from a top release buckle having an actuator member which is pushed downward into the buckle. A vehicle occupant can feel these differences by hand without looking at the buckles, and therefore can unlock either the shoulder belt buckle or the lap belt buckle conveniently without mistaking one for the other.

BRIEF DESCRIPTION OF THE DRAWINGS

The foregoing and other features of the invention will become apparent to those skilled in the art upon reading the following description of a preferred embodiment of the invention with reference to the accompanying drawings, wherein.

DESCRIPTION OF A PREFERRED EMBODIMENT

Figure 1:
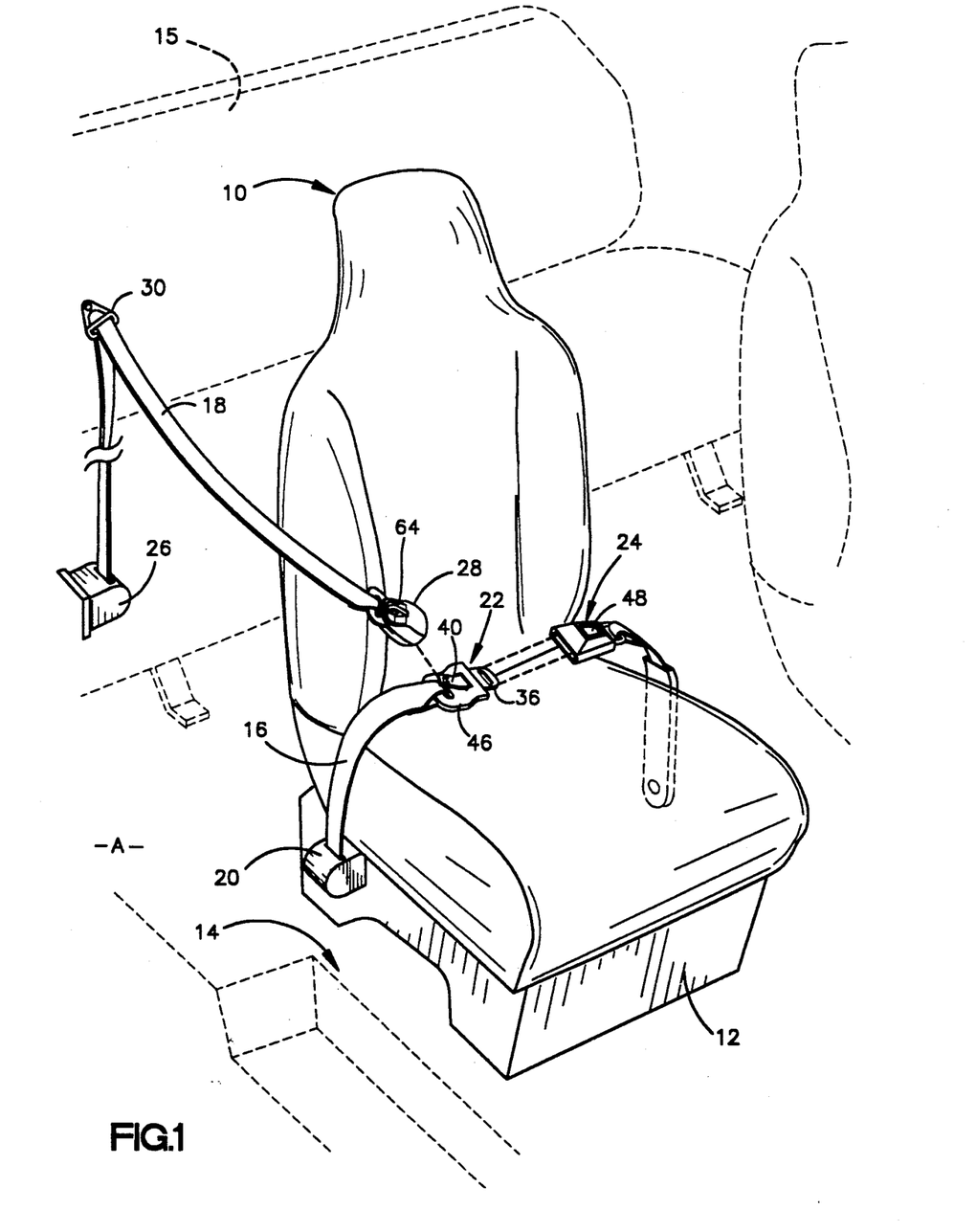
FIG. 1 is a view of a vehicle passenger compartment with a vehicle occupant restraint apparatus constructed in accordance with the present invention.

As shown in FIG. 1, a preferred embodiment of the invention is a three point seat belt system for restraining an occupant of a vehicle seat 10. The seat 10 has a base 12 which is mounted on the floor 14 of the vehicle. In this preferred embodiment of the invention, the vehicle is a van with an aisle A extending past the outboard side of the seat 10 to a bench seat 15 at the rear of the van.

The three point seat belt system comprises a lap belt 16 and a shoulder belt 18. The lap belt 16 has one end wound on a retractor 20, which is fixed to the base 12 of the seat 10, and another end connected to a latch member 22. The latch member 22 is lockable in a lap belt buckle 24 which is anchored to the base 12 of the seat 10 at the inboard side of the seat 10. The shoulder belt 18 similarly has one end wound on a retractor 26, which is fixed to the vehicle, and another end connected to a shoulder belt buckle 28. The shoulder belt 18 extends through a D-ring 30 which is fixed to the vehicle adjacent to the shoulder of an occupant of the seat 10. The shoulder belt buckle 28 is lockable to the latch member 22.

The lap belt 16 and the shoulder belt 18 are movable from retracted positions at the outboard side of the seat 10 to restraining positions extending across an occupant of the seat 10. As indicated by the dashed lines in FIG. 1, the latch member 22 is movable into and out of locked engagement with the lap belt buckle 24 at the inboard side of the seat 10. The shoulder belt buckle 28 is movable into and out of locked engagement with the latch member 22. When the shoulder belt buckle 28 is locked to the latch member 22, the lap belt 16 and the shoulder belt 18 are movable together across the seat 10. Because the shoulder belt buckle 28 is releasable from the latch member 22, the shoulder belt 18 can be retracted independently of the lap belt 16. It may be desirable to retract the shoulder belt 18 independently of the lap belt 16 in order to clear the aisle A for access to the bench seat 15. It may also be desirable to retract the shoulder belt 18 independently of the lap belt 16 in order to remove the seat 10 from the van, as van seats are sometimes removable.

Figure 2:
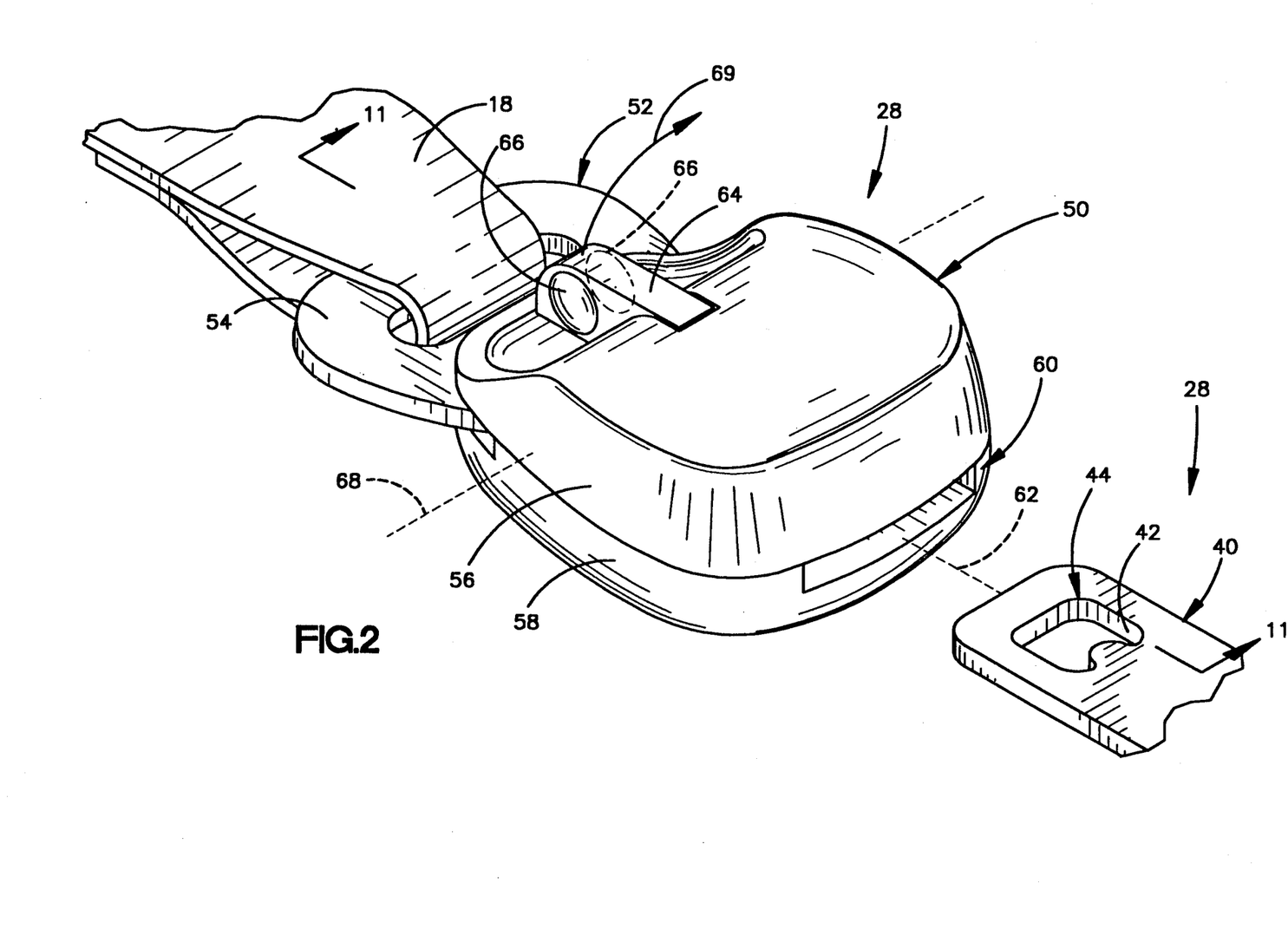
FIG. 2 is an enlarged partial view of the apparatus of FIG. 1.

The latch member 22 has a first tongue portion 36 (FIG. 1), which is lockable in the lap belt buckle 24, and a second tongue portion 40, which is lockable in the shoulder belt buckle 28. As shown in FIG. 2, the second tongue portion 40 of the latch member 22 has an inner edge surface 42 defining an opening 44. A plastic cover 46 (FIG. 1) is received over the latch member 22. The latch member 22 and the cover 46 in the preferred embodiment of the present invention are constructed in accordance with the invention set forth in applicant's co-pending patent application Ser. No. 788,546 entitled "Vehicle Occupant Restraint Apparatus". Alternatively, a conventional tongue could be used with either of the buckles 24 and 28 in a seat belt system other than the preferred system shown in the drawings.

The lap belt buckle 24 at the inboard side of the seat 10 is a top release buckle known in the art. When the first latch plate portion 36 of the latch member 22 is locked in the buckle 24, the buckle 24 and the latch member 22 are constrained from moving relative to each other. A pushbutton actuator 48 at the top of the buckle 24 moves downward in the buckle 24 when pushed by a vehicle occupant, and operates to release the first tongue portion 36 of the latch member 22 from the buckle 24. Alternatively, another type of buckle known in the art, such as an end release buckle having a pushbutton actuator at its end, could be used in place of the top release lap belt buckle 24.

As shown in FIG. 2, the shoulder belt buckle 28 comprises a housing 50 and an anchor plate 52. The anchor plate 52 includes an anchor bar 54 around which the end of the shoulder belt 18 is fastened in a loop. The housing 50 has upper and lower housing sections 56 and 58 which define an opening 60 at the front end of the housing 50. The opening 60 is centered on the longitudinal axis 62 of the buckle 28. The second tongue portion 40 of the latch member 22 is movable into the buckle 28 through the opening 60 in the direction of the longitudinal axis 62. An elongate lever arm 64 extends outward from the rear end of the housing 50. The lever arm 64 has opposite side surfaces with circular indentations 66. The lever arm 64 is thus adapted to be grasped between the thumb and forefinger of a vehicle occupant and pivoted by the vehicle occupant about a transverse axis 68 of the buckle 28, as indicated by the arrow 69 in FIG. 2. When the second tongue portion 40 of the latch member 22 is locked in the buckle 28, the lever arm 64 can be operated, i.e., pivoted about the transverse axis 68, to release the second tongue portion 40 for movement out of the buckle 28.

Figure 3:
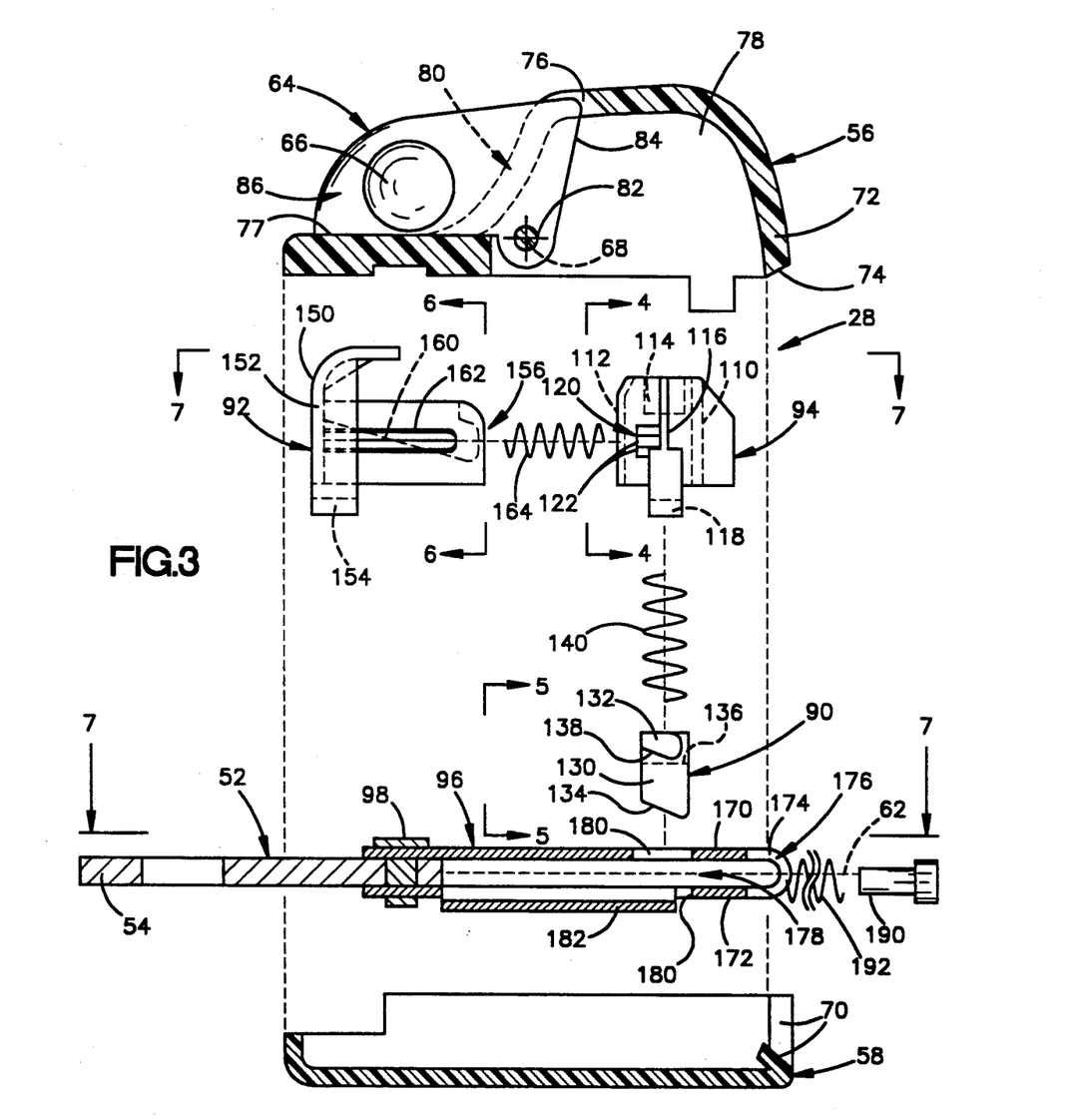
FIG. 3 is an exploded view, partly in section, of the buckle shown in FIG. 2.

The shoulder belt buckle 28 is shown in greater detail in FIG. 3. The lower housing section 58 has a front edge surface 70 which defines the lower and side edges of the opening 60. The upper housing section 56 has a front wall 72 with an edge surface 74 that defines the upper edge of the opening 60. The upper housing section 56 also has a rear wall 76, a generally planar surface 77 which extends away from and is located outside the rear wall 76, and a pair of side walls 78, one of which is shown in FIG. 3. The rear wall 76 has a slot 80 through which the lever arm 64 extends. A pin 82 extends across the inside of the upper housing section 56 between the side walls 78, and is centered on the transverse axis 68 of the buckle 28. The pin 82 supports the lever arm 64 for pivotal movement about the transverse axis 68. The lever arm 64 has a front edge surface 84 located inside the upper housing section 56, and has a handle portion 86 located outside the upper housing section 56. The handle portion 86 of the lever arm 64 has the indentations 66 on its opposite side surfaces.

As shown in FIG. 3, the shoulder belt buckle 28 has other parts which are contained between the upper and lower housing sections 56 and 58. These parts include a locking member 90, an unlocking member 92, and a guide member 94 in which the locking member 90 and the unlocking member 92 are movable. The locking member 90, the unlocking member 92 and the guide member 94 are plastic parts supported on a metal base 96, which is connected to the anchor plate 52 by a rivet 98.

Figure 4:
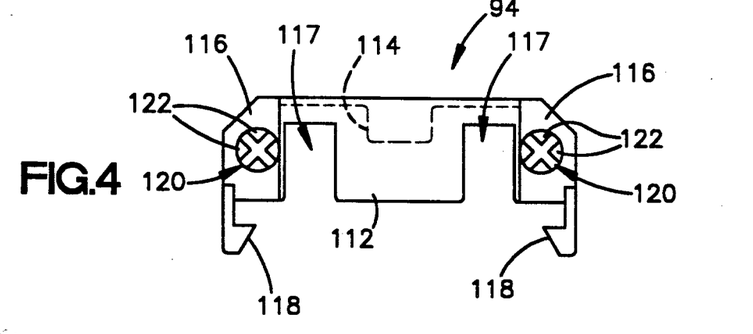
FIG. 4 is a view taken on line 4—4 of FIG. 3.

The guide member 94 has a front wall 110, a rear wall 112, and a cylindrical spring holder 114 located in the space between the front and rear walls 110 and 112. A pair of passages 117 extend through the front and rear walls 110 and 112, as shown in FIG. 4. The guide member 94 also has a pair of outer wing walls 116. Each of the outer wing walls 116 has a connecting hook 118 and an opening 120. A plurality of guide elements 122 extend rearwardly from the edges of the openings 120. The guide elements 122 define X-shaped entrances for the openings 120, as shown in FIG. 4. When the guide member 94 is installed on the base 96, the connecting hooks 118 hold the guide member 94 on the base 96.

Figure 5:
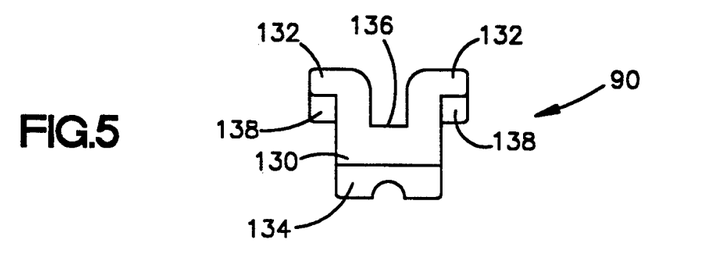
FIG. 5 is a view taken on line 5—5 of FIG. 3.
Figure 7:
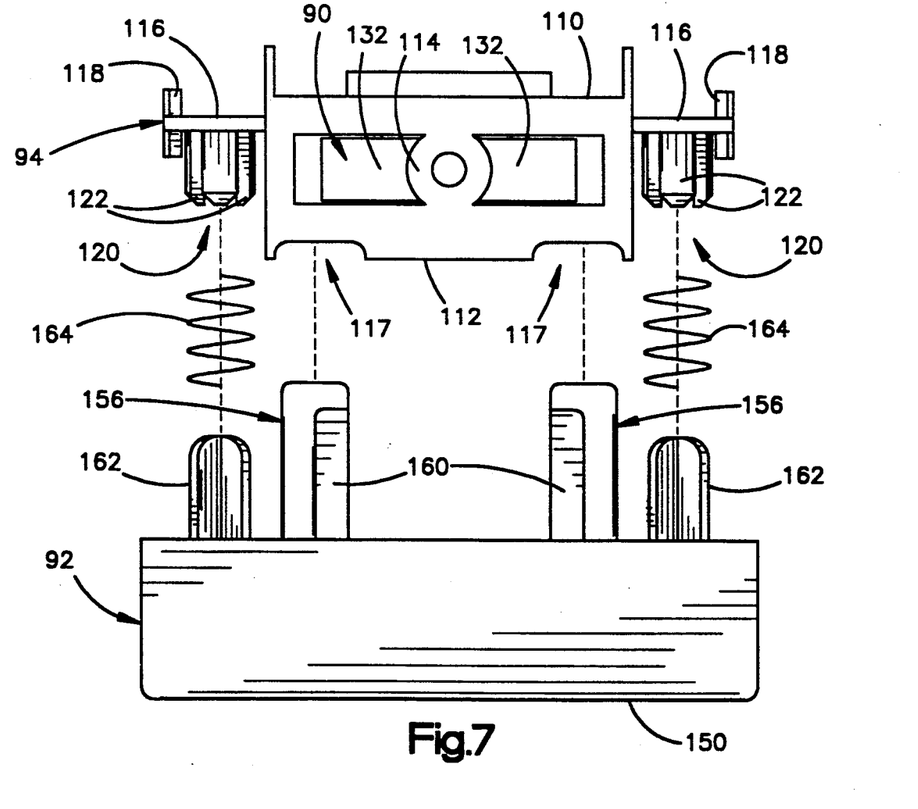
FIG. 7 is a view of the parts shown in FIGS. 4 and 5.

As shown in FIGS. 3 and 5, the locking member 90 has a body portion 130 and a pair of laterally extending projecting portions 132. The body portion 130 has an inclined lower surface 134 and a flat upper surface 136. Each of the projecting portions 132 has an inclined lower ramp surface 138. As shown in FIG. 7, the locking member 90 is receivable in the guide member 94 in the space between the front and rear walls 110 and 112 of the guide member 94. When the locking member 90 is received in the guide member 94, the ramp surfaces 138 on the locking member 90 extend laterally into the passages 117 in the guide member 94. A coil spring 140 extends from the spring holder 114 in the guide member 94 to the flat surface 136 on the locking member 90. The coil spring 140 urges the locking member 90 to move downward as shown in the drawings.

Figure 6:
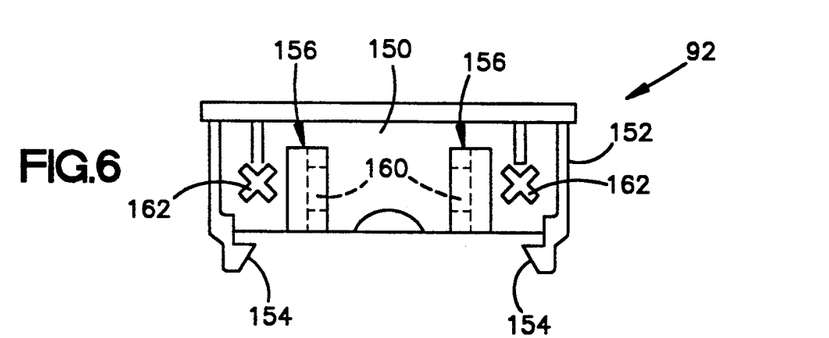
FIG. 6 is a view taken on line 6—6 of FIG. 3.
Figure 8:
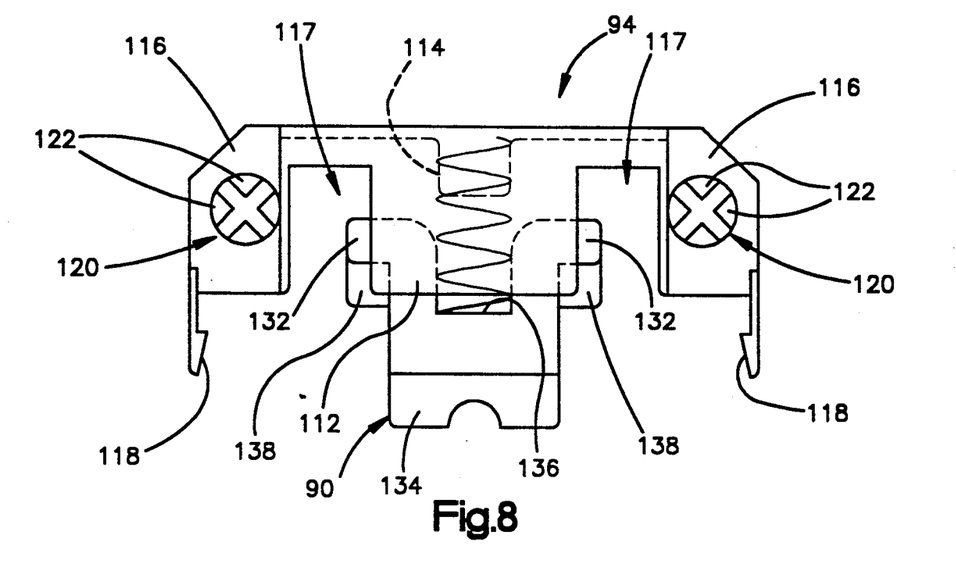
FIG. 8 is a view taken on line 8—8 of FIG. 3.

As shown in FIGS. 3, 6 and 8, the unlocking member 92 has a rear wall 150 and a pair of side walls 152. Each side wall 152 has a sliding hook 154 for supporting the unlocking member 92 to slide on the base 96. The unlocking member 92 also has a pair of ramp arms 156 extending forward from the rear wall 150. Each of the ramp arms 156 has an inclined ramp surface 160. The ramp surfaces 160 on the ramp arms 156 are inclined at the same angle as the ramp surfaces 138 on the locking member 90. As indicated in FIG. 8, each of the ramp arms 156 is receivable through one of the passages 117 in the guide member 94. When the ramp arms 156 extend through the passages 117, each of the ramp surfaces 160 on the ramp arms 156 extends beneath a respective one of the ramp surfaces 138 on the locking member 90. The ramp surfaces 160 are thus disposed in slidable contact with the ramp surfaces 138.

The unlocking member 92 further includes a pair of posts 162 extending forward from the rear wall 150. As indicated in FIG. 8, each of the posts 162 is receivable through a respective one of the openings 120 in the guide member 94. The posts 162 are X-shaped in cross section to fit into the entrances defined by the guide elements 122 at the openings 120.

A pair of coil springs 164 (FIG. 8) are received over the posts 162 on the unlocking member 92 and over the guide elements 122 on the guide member 94. The coil springs 164 extend between the rear wall 150 of the unlocking member 92 and the outer wing walls 116 of the guide member 94. The coil springs 164 resist movement of the rear wall 150 of the unlocking member 92 toward the outer wing walls 116 of the guide member 94, and urge the rear wall 150 to move away from the outer wing walls 116.

Figure 9:
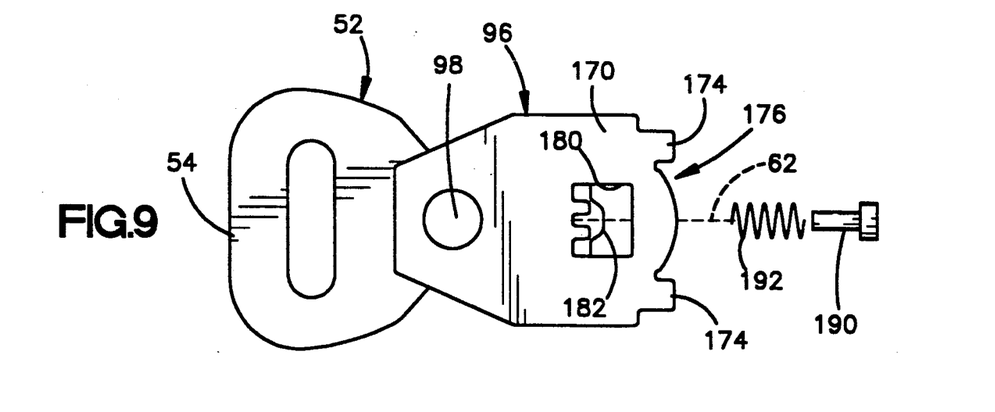
FIG. 9 is a view taken on line 9—9 of FIG. 3.

As shown in FIGS. 3 and 9, the base 96 has an upper wall 170, a lower wall 172, and a pair of front corner portions 174 connecting the upper wall 170 with the lower wall 172. An opening 176 between the upper and lower walls 170 and 172 extends across the front end of the base 96 between the corner portions 174. A passage 178 defined between the upper and lower walls 170 and 172 extends from the opening 176 toward the rear end of the base 96. The opening 176 and the passage 178 are both centered on the longitudinal axis 62 of the buckle 28. Additionally, each of the upper and lower walls 170 and 172 has an inner edge surface 180 defining an opening into which the body portion 130 of the locking member 90 is movable. The lower wall 172 has a stop element 182 for limiting movement of the locking member 90 downward in the base 96, as shown in FIG. 3.

Figure 10:
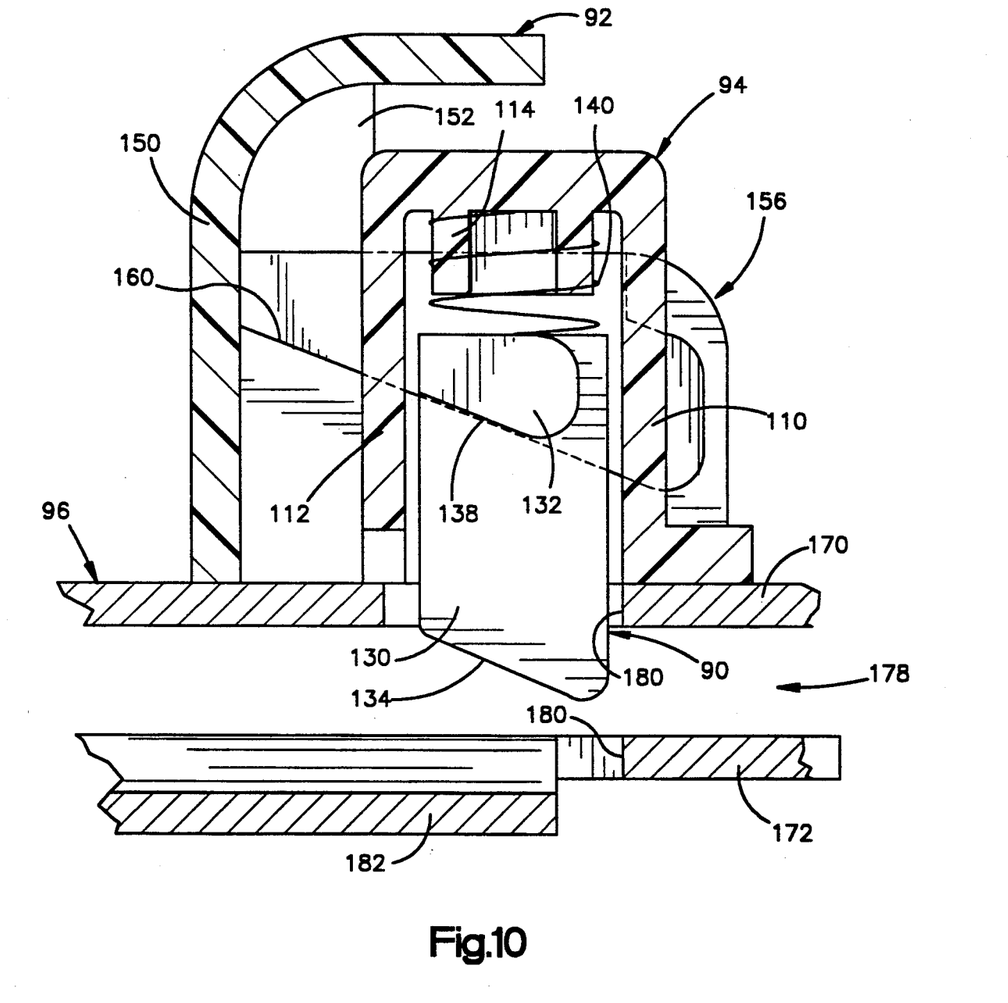
FIG. 10 is a side view, partly in section, of parts shown in FIG. 3.

The locking member 90, the unlocking member 92 and the guide member 94 are shown together in FIG. 10 in their positions assembled onto the base 96. When the locking member 90 is received in the guide member 94 as described above with reference to in FIG. 7, and when the unlocking member 92 is received in the guide member 94 as described above with reference to FIG. 8, those three parts are arranged relative to each other as shown in FIG. 10. The unlocking member 92 is movable relative to the guide member 94 and the locking member 90 to the right as shown in FIG. 10. Such movement of the unlocking member 92 is resisted by the coil springs 164 (FIG. 8). The unlocking member 92 is also movable relative to the locking member 90 and the guide member 94 to the left as shown in FIG. 10 under the influence of the coil springs 164. As described above, each of the ramp surfaces 160 on the ramp arms 156 of the unlocking member 92 extends beneath, and in slidable contact with, a respective one of the ramp surfaces 138 on the locking member 90. When the unlocking member 92 moves through the guide member 94 to the right as shown in FIG. 10, the ramp surfaces 160 slide beneath the ramp surfaces 138 and lift the locking member 90 upward against the bias of the coil spring 140. When the unlocking member 92 moves to the left as shown in FIG. 10, the ramp surfaces 160 slide beneath the ramp surfaces 138 and permit the locking member 90 to move downward under the influence of the coil spring 140.

As shown in FIG. 3, the shoulder belt buckle 28 also includes an ejector member 190 and an ejector spring 192 which are both received in the passage 178 in the base 96. When the ejector member 190 and the ejector spring 192 are received in the passage 178, the ejector spring 192 urges the ejector member 190 to move forward toward the opening 176.

Figure 11:
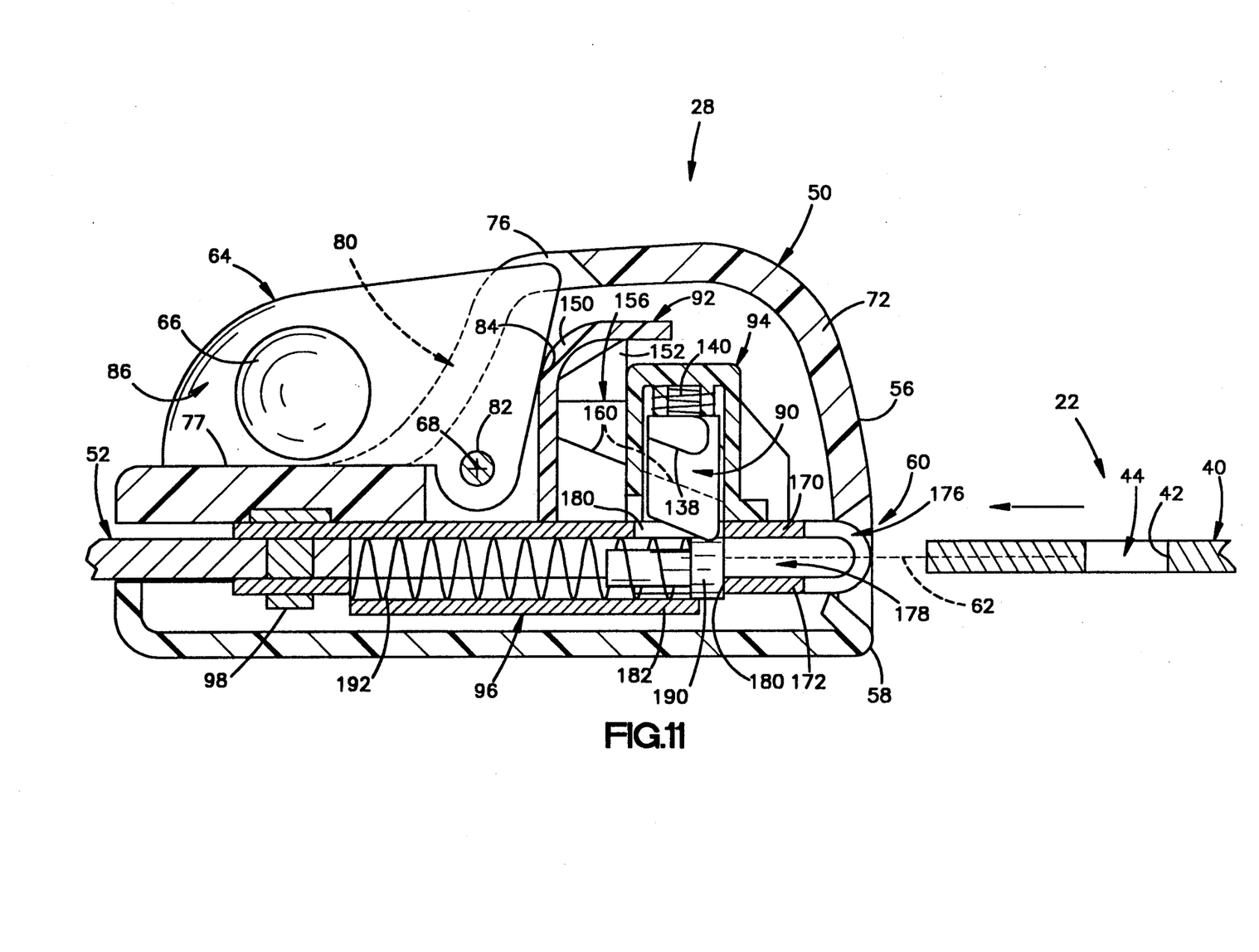
FIG. 11 is a view taken on line 11—11 of FIG. 2.

The shoulder belt buckle 28 operates to lock the second tongue portion 40 of the latch member 22 in the passage 178, and to release the second tongue portion 40 for movement out of the passage 178. As shown in FIG. 11, the shoulder belt buckle 28 has an initial condition before the second tongue portion 40 is moved into the passage 178. When the shoulder belt buckle 28 is in its initial condition, the ejector spring 192 holds the ejector member 190 against the inner edge surface 18 of the lower base wall 172. The ejector member 190 blocks movement of the locking member 90 downward into the passage 178 in the base 96. The coil springs 164 hold the unlocking member 92 in a position wherein the rear wall 150 of the unlocking member 92 is spaced back from the guide member 94. The rear wall 150 of the unlocking member 92 is thus pressed against the front edge surface 84 of the lever arm 64, and holds the lever arm 64 in a rest position wherein the handle portion 86 lies against the planar outer surface 77 at the rear of the housing 50.

Figure 12:
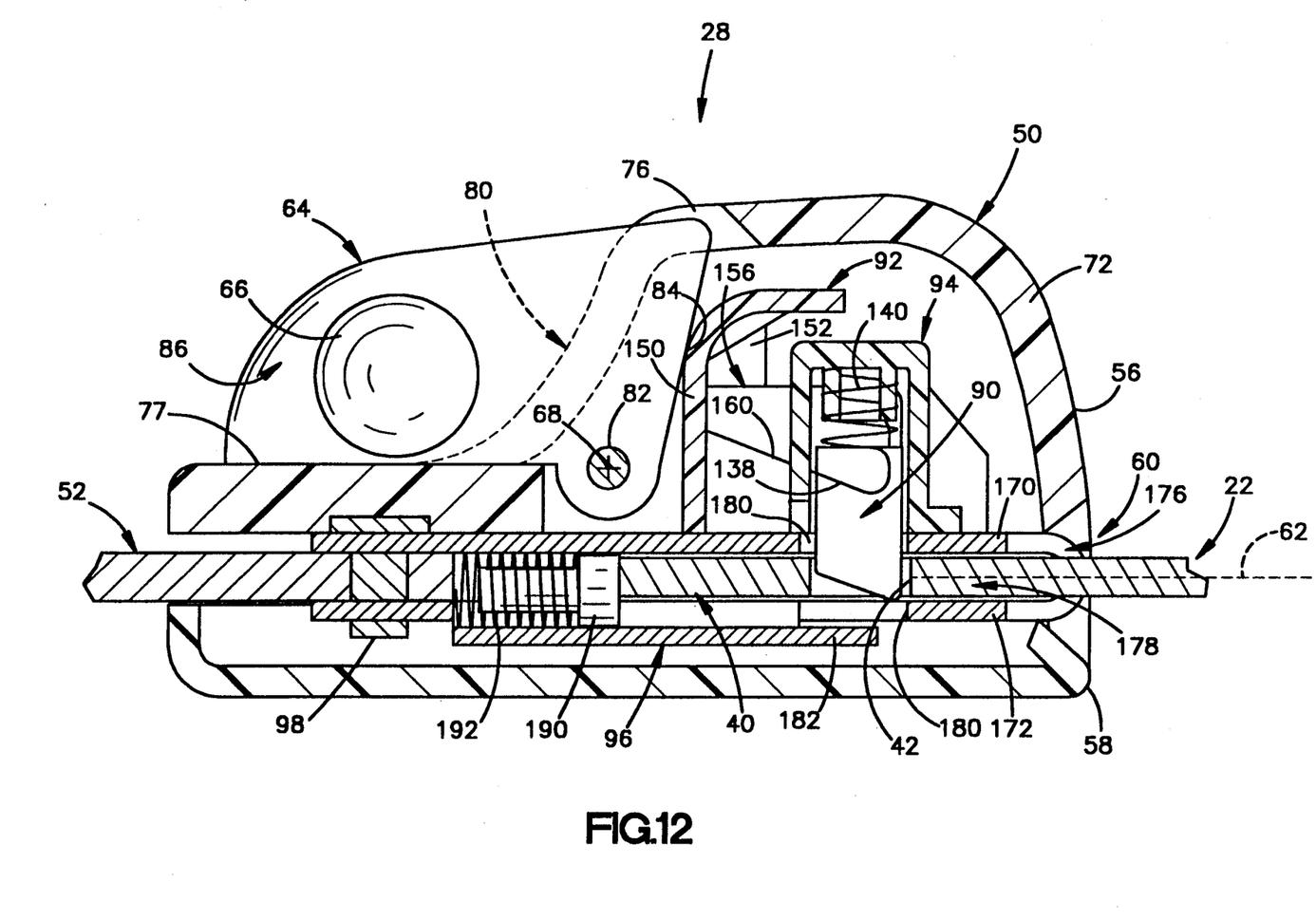
FIG. 12 is a view of the parts shown in FIG. 11 in a different condition.

As shown in FIGS. 2 and 11, the second tongue portion 40 of the latch member 22 is movable into the passage 178 in the base 96 through the openings 60 and 176 along the axis 62. The second tongue portion 40 can push the ejector member 190 toward the rear of the buckle 28 against the bias of the ejector spring 192 until the opening 44 in the second tongue portion 40 moves under the locking member 90. The coil spring 140 in the guide member 94 then moves the locking member 90 downward through the opening 44 in the second tongue portion 40. The second tongue portion 40 is thus locked in the shoulder belt buckle 28, as shown in FIG. 12. When the second tongue portion 40 is locked in the buckle 28, the buckle 28 and the latch member 22 are constrained from moving relative to each other because the second tongue portion 40 fits closely in the passage 178 and is held by the locking member 90.

Figure 13:
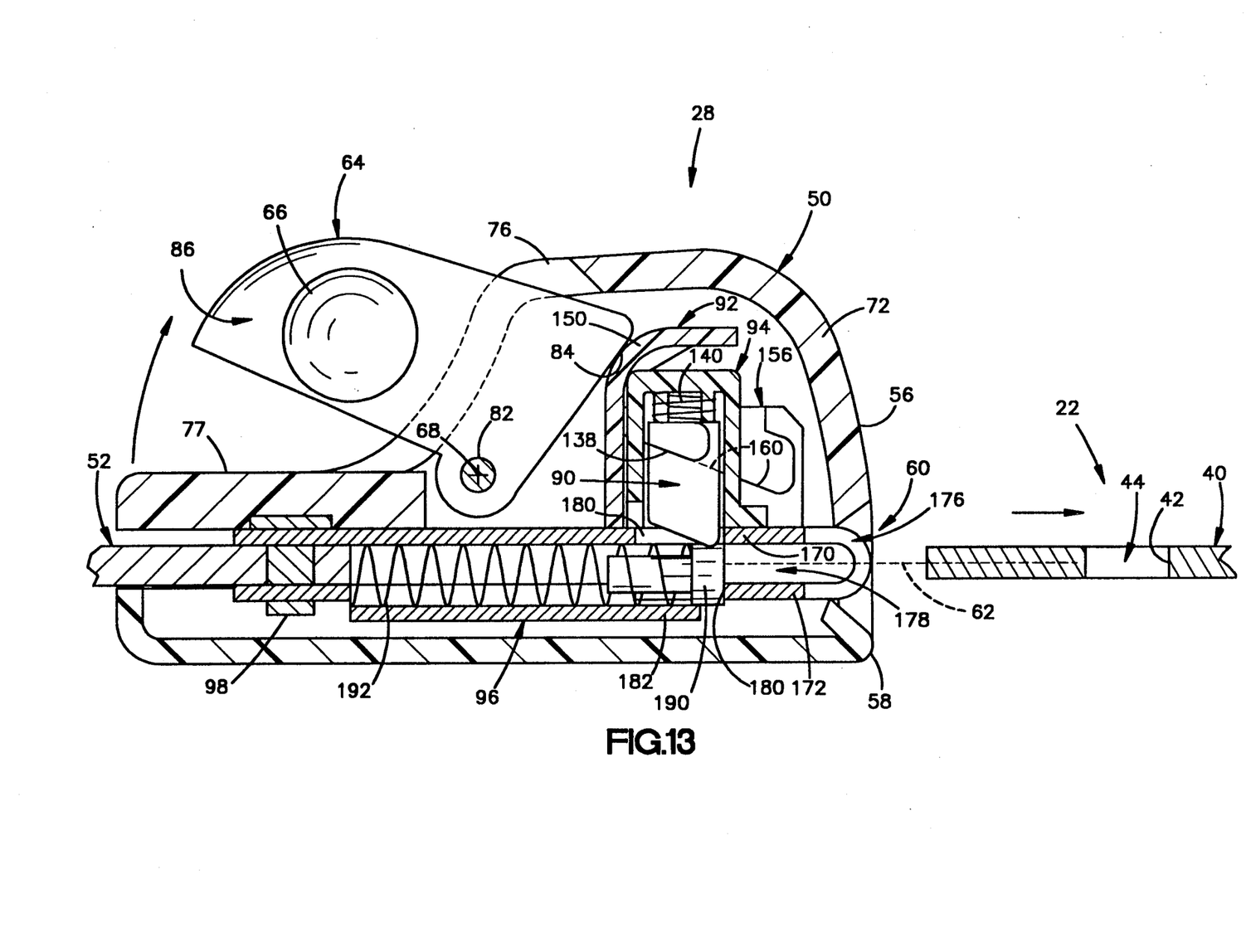
FIG. 13 is a view of the parts shown in FIG. 11 in another different condition.

The lever arm 64 is movable pivotally about the transverse axis 68 of the shoulder belt buckle 28 from the rest position shown in FIG. 12 to the fully actuated position shown in FIG. 13. When the lever arm 64 is thus moved by a vehicle occupant, the handle portion 86 is lifted off the planar outer surface 77 at the rear of the housing 50. The handle portion 86 moves pivotally in a direction toward the front of the shoulder belt buckle 28 and away from the base 96. The front edge surface 84 of the lever arm 64 moves pivotally in a direction toward the front of the buckle 28 and toward the base 96. The front edge surface 84 slides as a cam surface against the rear wall 150 of the unlocking member 92, and pushes the unlocking member 92 forward against the bias of the coil springs 164 from the position shown in FIG. 12 to the position shown in FIG. 13. As the unlocking member 92 moves toward the front of the buckle 28, the ramp surfaces 160 on the ramp arms 156 slide against the lower ramp surfaces 138 on the locking member 90. The sliding ramp surfaces 160 lift the locking member 90 upward against the bias of the coil spring 140. The unlocking member 92 thus moves the locking member 90 out of the opening 44 in the second tongue portion 40 of the latch member 22 to release the second tongue portion 40 for movement out of the passage 178. The ejector spring 192 and the ejector member 190 push the second tongue portion 40 forward to eject it from the passage 178.

As described with reference to a three point seat belt system, the shoulder belt buckle 28 constructed in accordance with the present invention provides a convenient means for an occupant of the seat 10 to remove the shoulder belt 18 while keeping the lap belt 16 in its restraining position. The lever arm 64 of the shoulder belt buckle 28 is grasped between its opposite sides and lifted by the vehicle occupant. It thus differs substantially from the pushbutton actuator 48 of the prior art seat belt buckle 24. Therefore, the vehicle occupant can unlock the prior art seat belt buckle 24 by pushing the pushbutton actuator 48 with the knowledge that the shoulder belt buckle 28 is not being inadvertently unlocked. The shoulder belt 18 and the lap belt 16 will therefore remain connected to each other by the latch member 22 during ordinary use of the three point seat belt system. Moreover, when the vehicle occupant wishes to remove the shoulder belt 18 while keeping the lap belt 16 in its restraining position, the lever arm 64 of the shoulder belt buckle 26 can be lifted to release the shoulder belt 18 from the latch member 22 with the knowledge that the lap belt 16 is not being inadvertently released.

From the above description of the invention, those skilled in the art will perceive improvements, changes and modifications. Such improvements, changes and modifications within the skill of the art are intended to be covered by the appended claims.

Having described the invention, the following is claimed:

1. A buckle for receiving a tongue connected to a seat belt, said buckle comprising:
   means for defining a passage into which the tongue is movable;
   locking means for locking the tongue in said passage, said locking means including a locking member which is movable in said passage, said locking member being movable into engagement with the tongue when the tongue is received in said passage to lock the tongue in said passage, said locking member being movable out of engagement with the tongue to release the tongue for movement out of said passage;
   unlocking means for unlocking the tongue, said unlocking means including an unlocking member which is movable relative to said locking member, said unlocking member having means for moving said locking member out of engagement with the tongue when said unlocking member is moving relative to said locking member; and
   lever means for moving said unlocking member relative to said locking member, said lever means comprising a lever arm supported for pivotal movement, said lever arm having a handle portion and a cam surface, said cam surface being movable in sliding contact with said unlocking member to move said unlocking member relative to said locking member upon pivotal movement of said handle portion in a first direction away from said passage;
   said passage having a front end with an opening into which the tongue is movable in a rearward direction, said unlocking member being movable by said lever arm relative to said locking member in a forward direction opposite to said rearward direction.

2. A buckle as defined in claim 1 further comprising a housing containing said locking member and said unlocking member, said handle portion of said lever arm extending outward from said housing throughout the range of movement of said lever arm, said cam surface being located inside said housing throughout the range of movement of said lever arm.

3. A buckle for receiving a tongue connected to a seat belt, said buckle comprising:
   means for defining a passage into which the tongue is movable;
   locking means for locking the tongue in said passage, said locking means including a locking member which is movable in said passage, said locking member being movable into engagement with the tongue when the tongue is received in said passage to lock the tongue in said passage, said locking member being movable out of engagement with the tongue to release the tongue for movement out of said passage;
   unlocking means for unlocking the tongue, said unlocking means including an unlocking member which is movable relative to said locking member, said unlocking member having means for moving said locking member out of engagement with the tongue when said unlocking member is moving relative to said locking member; and
   lever means for moving said unlocking member relative to said locking member, said lever means comprising a lever arm supported for pivotal movement, said lever arm having a handle portion and a cam surface, said cam surface being movable in sliding contact with said unlocking member to move said unlocking member relative to said locking member upon pivotal movement of said handle portion in a first direction away from said passage;
   said buckle further having a front end and a rear end, said passage having an opening at said front end for receiving the tongue, said lever arm being pivotal about a pivotal axis, said pivotal axis extending transversely across said buckle and being fixed in said buckle at a location between said front and rear ends, said lever arm extending across said pivotal axis from a front side of said pivotal axis to a rear side of said pivotal axis, said handle portion of said lever arm being located on said rear side of said pivotal axis, said cam surface being located on said front side of said pivotal axis.

4. A buckle as defined in claim 3 further comprising a housing containing said locking member and said unlocking member, said handle portion of said lever arm extending outward from said housing throughout the range of movement of said lever arm, said cam surface being located inside said housing throughout the range of movement of said lever arm.

5. A buckle for receiving a tongue connected to a seat belt, said buckle comprising:
   means for defining a passage into which the tongue is movable;
   locking means for locking the tongue in said passage, said locking means including a locking member which is movable in said passage, said locking member being movable into engagement with the tongue when the tongue is received in said passage to lock the tongue in said passage, said locking member being movable out of engagement with the tongue to release the tongue for movement out of said passage;
   unlocking means for unlocking the tongue, said unlocking means including an unlocking member which is movable relative to said locking member, said unlocking member having means for moving said locking member out of engagement with the tongue when said unlocking member is moving relative to said locking member; and lever means for moving said unlocking member relative to said locking member, said lever means comprising a lever arm supported for pivotal movement about a pivotal axis, said lever arm having a handle portion and a cam surface;

said cam surface on said lever arm being movable in sliding contact with said unlocking member to move said unlocking member relative to said locking member upon pivotal movement of said lever arm;

said handle portion of said lever arm being elongated in a lengthwise direction perpendicular to said pivotal axis, said handle portion of said lever arm having first and second side surfaces facing away from each other in opposite directions along said pivotal axis, said first and second side surfaces being spaced from each other a distance along said pivotal axis which is less than the length of said handle portion extending in said lengthwise direction.

6. A buckle as defined in claim 5 wherein said passage has a longitudinal axis along which the tongue is movable, said lengthwise direction being parallel to said longitudinal axis.

7. A buckle as defined in claim 6 wherein said passage has a front end with an opening into which the tongue is movable in a rearward direction, said unlocking member being movable by said lever arm relative to said locking member in a forward direction opposite to said rearward direction.

8. A buckle as defined in claim 5 wherein said first and second side surfaces of said handle portion of said lever arm respectively include first and second grasping surface means, said first and second grasping surface means enabling said lever arm to be grasped and moved pivotally by a vehicle occupant having a thumb and forefinger respectively engaging said first and second grasping surface means.

9. A buckle as defined in claim 8 wherein each of said first and second grasping surface means comprises an indented surface portion of the respective one of said first and second side surfaces.

10. A buckle as defined in claim 9 wherein each of said indented surface portions has a circular shape.

* * * * *